United States Patent
Sharma et al.

(10) Patent No.: US 8,454,724 B2
(45) Date of Patent: Jun. 4, 2013

(54) FLEXIBLE SYSTEM TO REMOVE CARBON DIOXIDE FROM A FEED NATURAL GAS

(75) Inventors: Bhargav Sharma, Niles, IL (US); William Echt, Highwood, IL (US)

(73) Assignee: UOP LLC, Des Plaines, IL (US)

(*) Notice: Subject to any disclaimer, the term of this patent is extended or adjusted under 35 U.S.C. 154(b) by 329 days.

(21) Appl. No.: 12/826,810

(22) Filed: Jun. 30, 2010

(65) Prior Publication Data
US 2012/0000355 A1 Jan. 5, 2012

(51) Int. Cl.
*B01D 53/22* (2006.01)

(52) U.S. Cl.
USPC ............ 95/12; 95/1; 95/8; 95/23; 95/51; 96/7; 96/9; 96/417; 96/422

(58) Field of Classification Search
USPC ............ 95/1, 8, 12, 23, 45, 51; 96/4, 7, 9, 96/417, 422
See application file for complete search history.

(56) References Cited

U.S. PATENT DOCUMENTS

| | | | |
|---|---|---|---|
| 5,538,536 A * | 7/1996 | Fuentes et al. | 95/51 |
| 5,873,928 A | 2/1999 | Callahan | |
| 6,632,266 B2 * | 10/2003 | Thomas et al. | 95/51 |
| 6,648,944 B1 | 11/2003 | Baker et al. | |
| 7,329,306 B1 * | 2/2008 | Koch | 95/51 |
| 7,429,287 B2 | 9/2008 | Frantz | |
| 7,455,721 B2 * | 11/2008 | Berger et al. | 96/4 |
| 7,537,641 B2 | 5/2009 | Lokhandwala et al. | |
| 7,575,624 B2 | 8/2009 | Cartwright et al. | |
| 2006/0042466 A1 * | 3/2006 | Gaertner et al. | 96/4 |
| 2008/0176174 A1 | 7/2008 | White et al. | |
| 2008/0302013 A1 | 12/2008 | Repasky et al. | |
| 2009/0277327 A1 | 11/2009 | Zhou | |
| 2009/0277328 A1 | 11/2009 | Wijmans et al. | |

FOREIGN PATENT DOCUMENTS

| | | | |
|---|---|---|---|
| JP | 63123421 A | | 5/1988 |
| JP | 2008104949 A | | 5/2008 |
| JP | 2008-238099 | * | 10/2008 |
| JP | 2008238099 A | | 10/2008 |
| JP | 2009238994 A | | 10/2009 |
| WO | 2009087156 | | 7/2009 |

OTHER PUBLICATIONS

Yang, D. et al., "Parametric study of the membrane process for carbon dioxide removal from natural gas", Industrial and Engineering Chemistry Research, 48(19):9013-9022 (2009).

Anderson, C. L., et al., "Membrane CO2 removal from natural gas, grissik gas plant, Sumatra, Indonesia", GPA Annual Convention Proceedings, p. 13 (2005), Gas Processors Association 84th Convention, San Antonio, TX (2005), TX Gas processors Association.

Carapellucci, et al., "Carbon Dioxide Separation through Polymeric Membrane Systems for Flue Gas Applications", Proceedings of the Institution of Mechanical Engineers, Part A: Journal of Power and Energy, 218(4): 219-229 (2004).

Datta, A.K., et al., "Optimization of membrane unit for removing carbon dioxide from natural gas", Journal of Membrane Science,(ISSN: 03767388) 283(1/2): 291-300, (2006).

"Gas processes 2000: Separex membrane systems", Hydrocarbon Processing, (ISSN: 00188190) 79(4):88 (2000).

Dortmundt, David et al., Recent Developments in CO2 Removal Membrane Technology, pp. 1-31, dated 1999.

* cited by examiner

*Primary Examiner* — Jason M Greene
(74) *Attorney, Agent, or Firm* — Mark Goldberg

(57) ABSTRACT

A system and process for the removal of carbon dioxide ($CO_2$) from a feed natural gas having variable flow rates and inlet $CO_2$ levels.

20 Claims, 5 Drawing Sheets ial partial pressure of the permeating component. Therefore, the pressure difference between the feed gas and permeate gas and the concentration of the permeating component determine the product purity and the amount of carbon dioxide membrane surface required.

FLEXIBLE SYSTEM TO REMOVE CARBON DIOXIDE FROM A FEED NATURAL GAS

FIELD OF THE INVENTION

The invention relates to removal of carbon dioxide ($CO_2$) from a feed gas, in particular feed natural gas, having variable flow rates and inlet $CO_2$ levels.

DESCRIPTION OF RELATED ART

Carbon dioxide is commonly found in natural gas streams at levels as high as 80%. In combination with water, it is highly corrosive and rapidly destroys pipelines and equipment unless it is partially removed or expensive construction materials are used. Carbon dioxide also reduces the heating value of a natural gas stream and wastes pipeline capacity. In LNG plants, $CO_2$ must be removed to prevent freezing in the low-temperature chillers.

Gas treating membrane systems provide a safe and efficient option for water vapor and carbon dioxide removal from natural gas. Carbon dioxide membranes operate on the principle of selective permeation. Each gas component has a specific permeation rate. The rate of permeation is determined by the rate which a component dissolves into the membrane surface and the rate at which it diffuses through the membrane.

The components with higher permeation rates (such as $H_2O$, $CO_2$, $H_2$, and $H_2S$) will permeate faster through the membrane module than components with lower permeation rates (such as $N_2$, $C_1$, $C_2$ and heavier hydrocarbons). For example, carbon dioxide is a "fast," more permeable, gas than methane. When a stream consisting of these two gases contacts the membrane, the carbon dioxide will permeate through the membrane at a faster rate than the methane. Thus, the feed stream is separated into a methane-rich (residual) stream on the high-pressure side of the membrane and a carbon dioxide-rich (permeate) stream on the low-pressure side of the membrane.

The primary driving force of the separation is the differential partial pressure of the permeating component. Therefore, the pressure difference between the feed gas and permeate gas and the concentration of the permeating component determine the product purity and the amount of carbon dioxide membrane surface required.

SUMMARY OF THE INVENTION

The present invention is associated with a system for treating a feed gas stream containing an undesirable amount of $CO_2$ comprising: (a) a pre-membrane unit comprising a membrane and having a feed side and a residue side; (b) a first gas flow line connected to the feed side of the pre-membrane unit for transferring a feed gas stream to the feed side of the pre-membrane unit; (c) a primary membrane unit comprising a membrane and having a feed side and a residue side; (d) a second gas flow line connecting the residue side of the pre-membrane unit to the feed side of the primary membrane unit for transferring a first residual gas stream from the residue side of the pre-membrane unit to the feed side of the primary membrane unit; (e) a first bypass around the pre-membrane unit, wherein the first bypass connects the first gas flow line to the second gas flow line to allow at least partial bypass of the feed gas stream around the pre-membrane unit; and (f) a second bypass around the primary membrane unit, wherein the second bypass connects the second gas flow line to a third gas flow line connected to the residual side of the primary membrane unit to allow at least partial bypass of the first residual gas stream around the primary membrane unit.

The present invention is further associated with treating a feed gas stream containing an undesirable amount of $CO_2$ comprising: (a) feeding a feed gas stream through a first gas flow line to a pre-membrane unit; (b) in the pre-membrane unit, separating the feed gas stream into a first permeate stream enriched in $CO_2$ and a first residue stream having reduced $CO_2$; (c) directing the first residue stream through a second gas flow line to a primary membrane unit to separate the first residue stream into a second permeate stream enriched in $CO_2$ and a second residue stream deplete of $CO_2$; (d) monitoring flow rate, $CO_2$ concentration, or both of the feed gas stream; (e) upon detection of pre-selected feed gas flow rates, $CO_2$ concentrations, or both, diverting at least part of the feed gas stream to a first bypass connected to the first gas flow line to allow bypass of the feed gas stream as required from the pre-membrane unit; (f) monitoring flow rate, $CO_2$ concentration, or both of the first residual gas stream; (e) upon detection of pre-selected gas flow rates, $CO_2$ concentrations, or both, in the first residual gas stream, diverting at least part of the first residual gas stream to a second bypass connected to the second gas flow line to allow bypass of the residual gas stream as required from the primary membrane unit.

The present invention is further associated with a system for treating a feed gas stream containing an undesirable amount of $CO_2$ comprising: (a) a first gas flow line for feeding a feed gas stream to a pre-membrane unit; (b) at least one valve in the pre-membrane unit for partial isolation of some percentage of the membrane, thus making that membrane area unavailable for gas processing; (c) a second gas flow line for feeding a feed gas stream to a primary membrane unit; and (d) at least one valve in the primary membrane unit for partial isolation of a percentage of the membrane, thus making that membrane area unavailable for gas processing. In one aspect, the primary membrane unit has unequal sub-sections of membrane area that can be isolated, thus making various percentages of membrane area unavailable for gas processing.

These and other embodiments relating to the present invention are apparent from the following Detailed Description.

Figure 1:
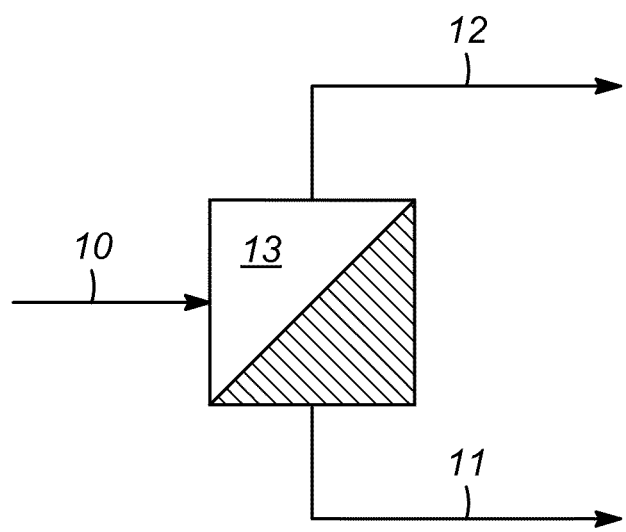
FIG. 1 is a prior art one-stage membrane processing scheme.

The same reference numbers are used to illustrate the same or similar features throughout the drawings. The drawings are to be understood to present an illustration of the invention and/or principles involved. As is readily apparent to one of skill in the art having knowledge of the present disclosure, process system apparatuses comprising these membrane units, according to various other embodiments of the invention will have configurations and components determined, in part, by their specific use.

DETAILED DESCRIPTION

Aspects of the invention are directed to systems for removal of carbon dioxide ($CO_2$) from a feed gas utilizing a pre-membrane unit and selective bypass.

Membranes have been widely used in two main $CO_2$ removal applications: Natural gas sweetening and Enhanced Oil Recovery (EOR), where $CO_2$ is removed from an associated natural gas stream and reinjected into the oil well to enhance oil recovery. Other applications also exist, for example landfill gas purification.

Membranes typically used for $CO_2$ removal are polymer based, for example, cellulose acetate, polyimides, polyamides, polysulfone, polycarbonates, and polyetherimide. The most widely used and tested material is cellulose acetate polymer. Polyimide polymer also has some potential in certain $CO_2$ removal applications. Cellulose acetate membranes are now the most widely used membrane material for $CO_2$ removal from natural gas. For the present invention, the polymer used does not necessarily affect the decision to apply the described system design. The arrangement of the bypasses and membrane isolation can be applied to any membrane system, regardless of the polymer material in use.

The membranes used for $CO_2$ removal do not operate as filters, where small molecules are separated from larger ones through a medium with pores. Instead, they operate on the principle of solution-diffusion through a nonporous membrane. The $CO_2$ first dissolves into the membrane and then diffuses through it. Because the membrane does not have pores, it does not separate on the basis of molecular size. Rather, it separates based on how well different compounds dissolve into the membrane and then diffuse through it.

Because carbon dioxide, hydrogen, helium, hydrogen sulfide, and water vapor, for example, permeate quickly, they are called "fast" gases. Carbon monoxide, nitrogen, methane, ethane and other hydrocarbons permeate less quickly and so are called "slow" gases. The membranes allow selective removal of fast gases from slow gases. For example, as $CO_2$ is removed from a natural gas stream, water and $H_2S$ are removed at the same time; but methane, ethane, and higher hydrocarbons are removed at a much lower rate. Both permeability and selectivity are important considerations when selecting a membrane. The higher the permeability, the less membrane area is required for a given separation and therefore the lower the system cost. The higher the selectivity, the lower the losses of hydrocarbons as $CO_2$ is removed and therefore the higher the volume of salable product.

Gas separation membranes are generally manufactured in one of two forms: flat sheet or hollow fiber. The flat sheets are typically combined into spiral-wound elements that are oriented horizontally, and the hollow fibers are woven into a bundle element that can be oriented either vertically or horizontally. For the present invention, the choice of spiral-wound or hollow fiber membrane elements does not necessarily affect the decision to apply the described system design. The arrangement of the bypasses and membrane isolation can be applied to any membrane system, regardless of the type of element in use.

The simplest prior art membrane processing scheme is a one-stage flow scheme (FIG. 1). A feed gas (10) is separated into a permeate stream (11) rich in $CO_2$ and a $CO_2$-depleted residual stream (12) using a membrane unit (13). In high $CO_2$ removal applications, a significant amount of hydrocarbons permeate the membrane and are lost. Multistage systems attempt to recover a portion of these hydrocarbons.

Figure 2:
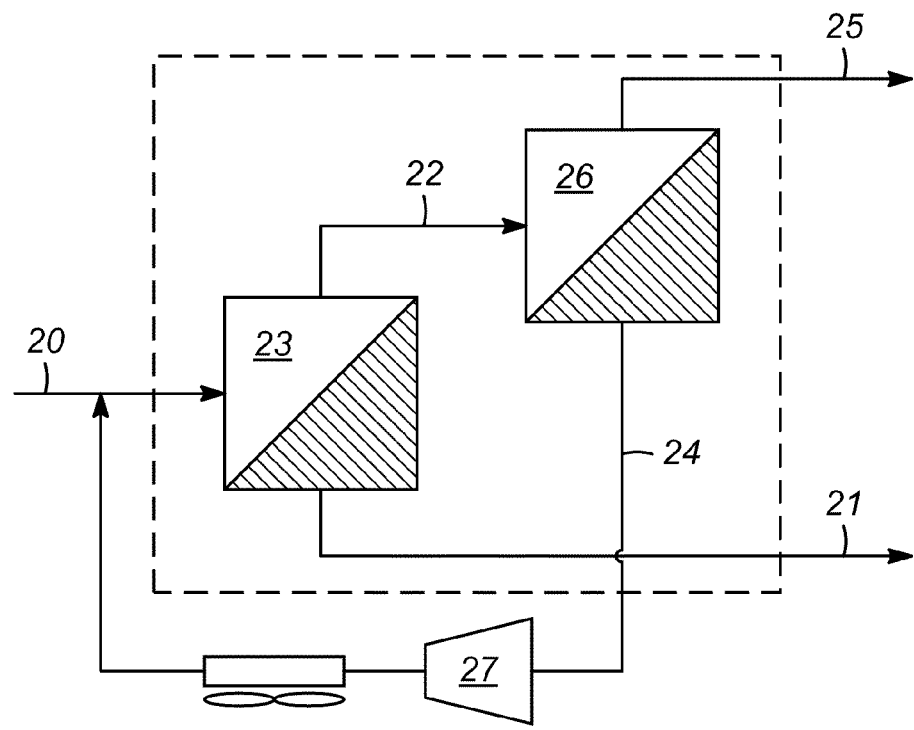
FIG. 2 is a prior art two-step membrane processing scheme.

The prior art two-step design shown in FIG. 2 allows only a portion of the first-stage permeate to be lost. The rest is recycled to the feed of the first stage. A feed gas (20) is separated into a permeate stream (21) rich in $CO_2$ and a $CO_2$-depleted residual stream (22) using a membrane unit (23). The residual stream (22) is further separated into a permeate stream (24) and a residual stream (25) using membrane unit (26). Permeate stream (24) is recycled and combined with feed gas (20). Permeate stream exiting membrane unit (26) is at low pressure, thus it is pressurized in a compressor (27) prior to combining with feed gas (20).

Figure 3:
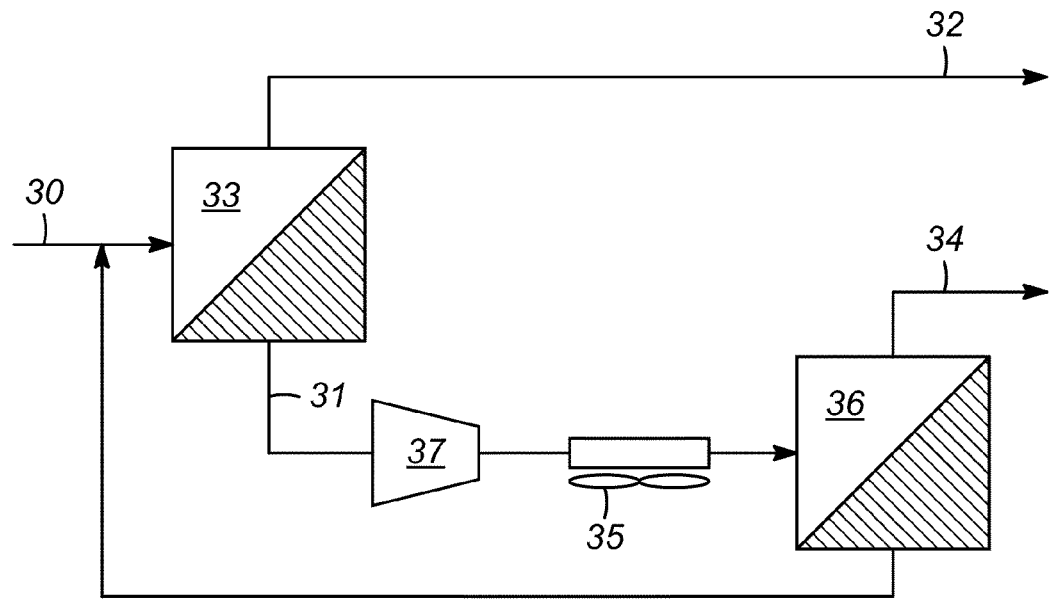
FIG. 3 is prior art two-stage membrane processing scheme.

The prior art two-stage design shown in FIG. 3 processes the first-stage permeate in a second membrane stage. A feed gas (30) is separated into a permeate stream (31) rich in $CO_2$ and a $CO_2$-depleted residual stream (32) using a membrane unit (33). The permeate stream (31) is further separated into a permeate stream (34) and a recycle stream (35) using membrane unit (36). Residual stream (35) is recycled and combined with feed gas (30). The permeate stream 34 from the second stage typically has twice the $CO_2$ content as the first-stage permeate stream (31). A compressor (37) is required to pressurize the first-stage permeate (31) before it is processed in the second stage. Two-stage designs provide higher hydrocarbon recoveries than two-step or one-stage designs but require more compressor power because more gas must be compressed.

A problem with typical $CO_2$ systems is the inability to significantly vary the flow rate and amount of $CO_2$ in the feed stream. Conventional practice is that the membrane systems are designed for, and operated within, a fairly narrow band of $CO_2$ content and flow rate (e.g. $CO_2$ contents of 95-110% of design and/or flow rates of 95-110% of design.) It would be desirable to allow wide ranges of feed gas flow rates, e.g. 50 to 210 MMSCFD (million standard cubic feet per day). It would also be desirable to provide process capacity for varying $CO_2$ levels, e.g. 8 to 60 mole %. However, the system should still operate under tight product specifications on residue and permeate gas composition. Such requirements are becoming more and more common for Floating Production Storage and Offloading (FPSO) Units.

In addition, typical $CO_2$ systems need to be shut down in order to replace membrane elements. Therefore it would also be desirable to have a membrane system that is easily serviced without completely shutting the system down. Production of oil and gas reserves generates maximum revenues at maximum flow rates. Therefore, a membrane gas processing unit for $CO_2$ removal with isolation of membrane area that allows for partial reduction in gas flows in lieu of total shutdown for membrane element replacement is economically favored over a system without any capability of isolating sub-sections of membrane area while maintaining gas processing in the on-line membrane sub-sections.

Thus, the present invention is directed to a $CO_2$ removal system that provides for both variable range of feed flow rate (e.g. 50 to 210 MMSCFD) and $CO_2$ (e.g. 8 to 60 mole %) content values. In accordance with the present invention, two membrane sections are connected in series with a gas reheat in between. Flexibility to handle the large range of $CO_2$ content is achieved by providing bypasses around the two membrane sections and by non-uniform isolation for the second membrane section. Current standard systems (prior art) cannot be operated optimally over such a wide operating envelope. Current limitations include (a) higher pressure drops through membrane (potential damage to membrane material) and (b) lower levels of variation in the available membrane area for CO2 removal.

Accordingly, the membrane system contains both a pre-membrane unit and a primary membrane unit. This arrangement provides a single-stage membrane with re-heat between the sections and by-passes. The membrane separates the gas into a $CO_2$ rich permeate stream and a $CO_2$ depleted residue stream.

Figure 4:
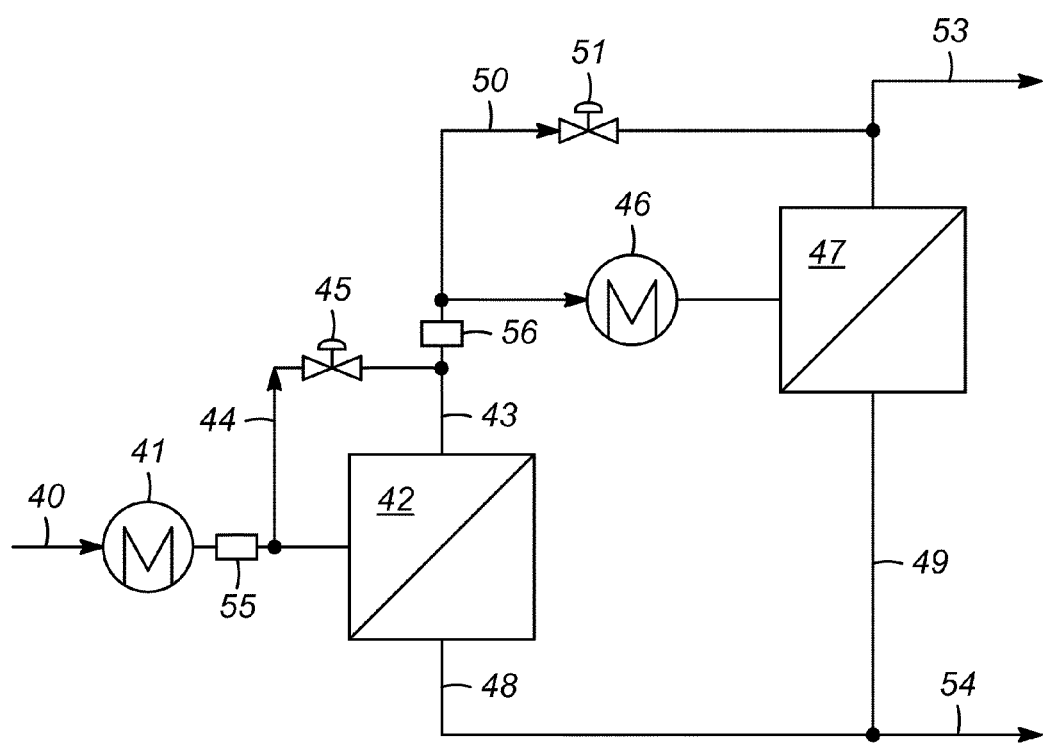
FIG. 4 is a system for removal of carbon dioxide ($CO_2$) from a feed gas in accordance with one aspect of the invention.

Turning to FIG. 4, a pre-treated feed gas (40) containing an undesirable level of $CO_2$ flows into Pre-Membrane Heater Unit (41). Feed gas pre-treatment may include any or all of the following steps (presented here in no particular order): (a) removal of entrained liquids, (b) removal of entrained solids, (c) removal of trace contaminants (e.g. pipeline inhibitors, lubricating oils or well treating chemicals) and (d) dew point control. The feed gas (40) is heated to a temperature of 27 to 60° C., for example, 49 to 55° C. The pressure in the Pre-Membrane Heater Unit (41) is generally 3100 to 8300 kilopascal (kPa) absolute, for example 5200 to 6900 kPa.

The pre-heated feed gas is then treated in Pre-Membrane Unit (42) where $CO_2$ is removed to produce residue (non-permeate) gas (43). This initial "cut" of $CO_2$ from the feed gas helps to "level out" the peak (highest) $CO_2$ levels. The Pre-Membrane Unit is intended to handle the very high range of $CO_2$ in the feed gas (e.g. above 25 mole %), allowing the downstream Primary Membrane Unit (47) to be smaller. In cases where the feed gas $CO_2$ levels are low (e.g. below 15%), the pre-membrane unit bypass is at least partially opened as the added membrane area required for high levels of $CO_2$ is not required. In one aspect, for simplicity of operation, Pre-Membrane Unit (42) is on-line all the time. A bypass (44) is provided to bypass the Pre-Membrane Unit (42). The bypass allows flexibility in the operation of the system. The bypass allows flexibility in the operation of the system. The bypass valve (45) may be automatically controlled or set manually by the operator when adjustment is made due to $CO_2$ content. A monitor (55) may be placed in line (40) to monitor the feed rate, pressure, and/or $CO_2$ content of the pre-heated gas.

Figure 5:
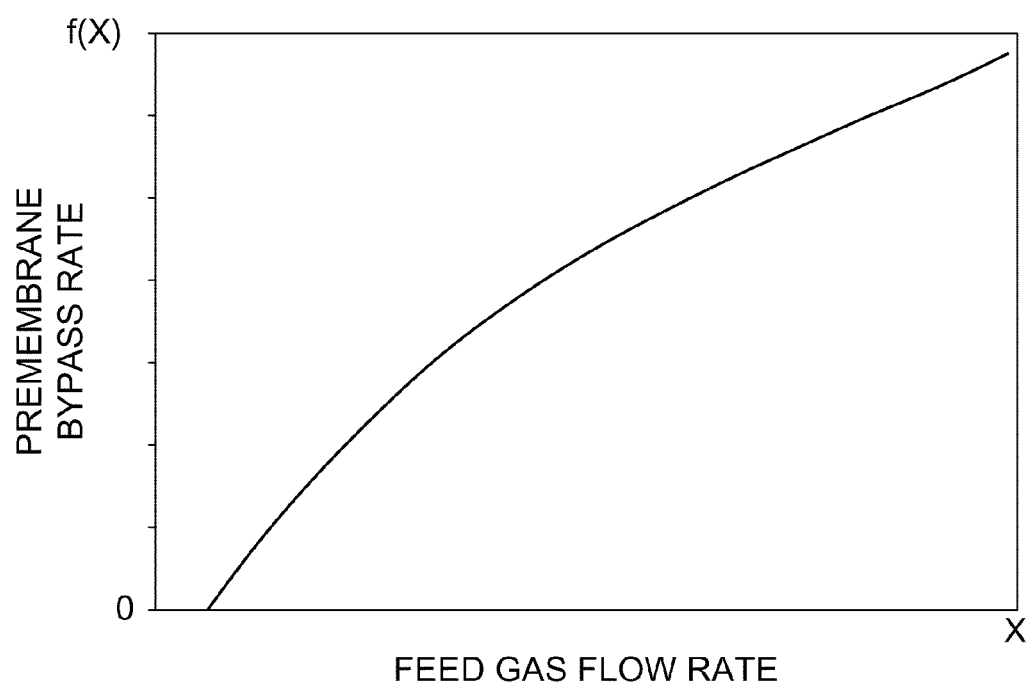
FIG. 5 is graph of a pre-membrane bypass flow rate as a function of a feed gas flow rate.

The bypass may also be opened if the differential pressure from feed-to-residue becomes too high (e.g. high flow rates). The bypass valve may be actuated on input from a monitor such as a differential pressure indicator/controller which is only active at the highest flow rates (for example, above 100 MMSCFD). High differential pressure may have two harmful effects: (a) the membrane differential pressure may be exceeded, causing deformation of the membrane elements and/or (b) there could be negative effects on downstream processing units. When the differential pressure across the pre-membrane unit increases above, for example, 70 to 100 kPa, the bypass valve (45) partially opens across the pre-membrane unit until a lower pressure drop is obtained. The bypass valve can also be easily controlled by monitoring the design flow rates and $CO_2$ level (operating envelope) and establishing a correlation between total feed gas flow rate and amount of bypass required. One such example is shown in FIG. 5. Note that the correlation is derived based on various feed flow rate and corresponding $CO_2$ level at that rate. The bypass valve may also be operated manually.

In another aspect, the bypass valve (45) allows complete bypass during membrane element replacement in the Pre-Membrane Unit. This allows the $CO_2$ removal system to remain on-line during maintenance of the system.

The residue gas (43) is delivered to the Membrane Preheater Unit (46) for re-heating, to a temperature of 27 to 60° C., for example, 49 to 55° C. The pressure in the Membrane Preheater Unit (46) is generally 3000 to 8200 kPa. The heated residue gas (43) is then delivered to the Primary Membrane Unit (47) where the $CO_2$ content of the gas is further reduced to desired specification.

A bypass (50) is also provided to control differential pressure at very high gas rates and/or to bypass membrane area when feed gas $CO_2$ is at a low level. The bypass valve (51) may be automatically or manually controlled. A monitor (56) may also be placed in line (43) to monitor the feed rate, pressure, and/or and $CO_2$ content of the pre-heated gas. The residue gas (53) from Primary Membrane Unit (47) may be processed further.

The permeate gas stream (48) from Pre-Membrane Unit (42) and the permeate gas stream (49) from Primary Membrane Unit (47) are comingled (stream (54)) and delivered to a final destination (e.g. vent, flare or reinjection for sequestration). The permeate streams may each contain back-pressure control valves (not shown).

Excellent turndown to deal with varying feed flow and $CO_2$ content can be further achieved by isolation of the membrane area into non-equal sub-sections within the Primary Membrane Unit (47). The first adjustment when optimizing membrane performance is to match the operating membrane area to the amount needed for a given $CO_2$ removal requirement. Using equal sub-sections provides some turndown, but not as much variation and control as unequal sub-sections. At least two sub-sections are used, generally at least three, and preferably four subsections are used. Each sub-section has manual double block and bleed isolation valves which safely removes the sub-section from operation and allows membrane replacement on the idle sub-section while other sub-sections continue to operate. Operating guidelines are provided on the flow rates and $CO_2$ levels that require isolation or operation of the various sub-sections. See FIG. 6

Figure 6:
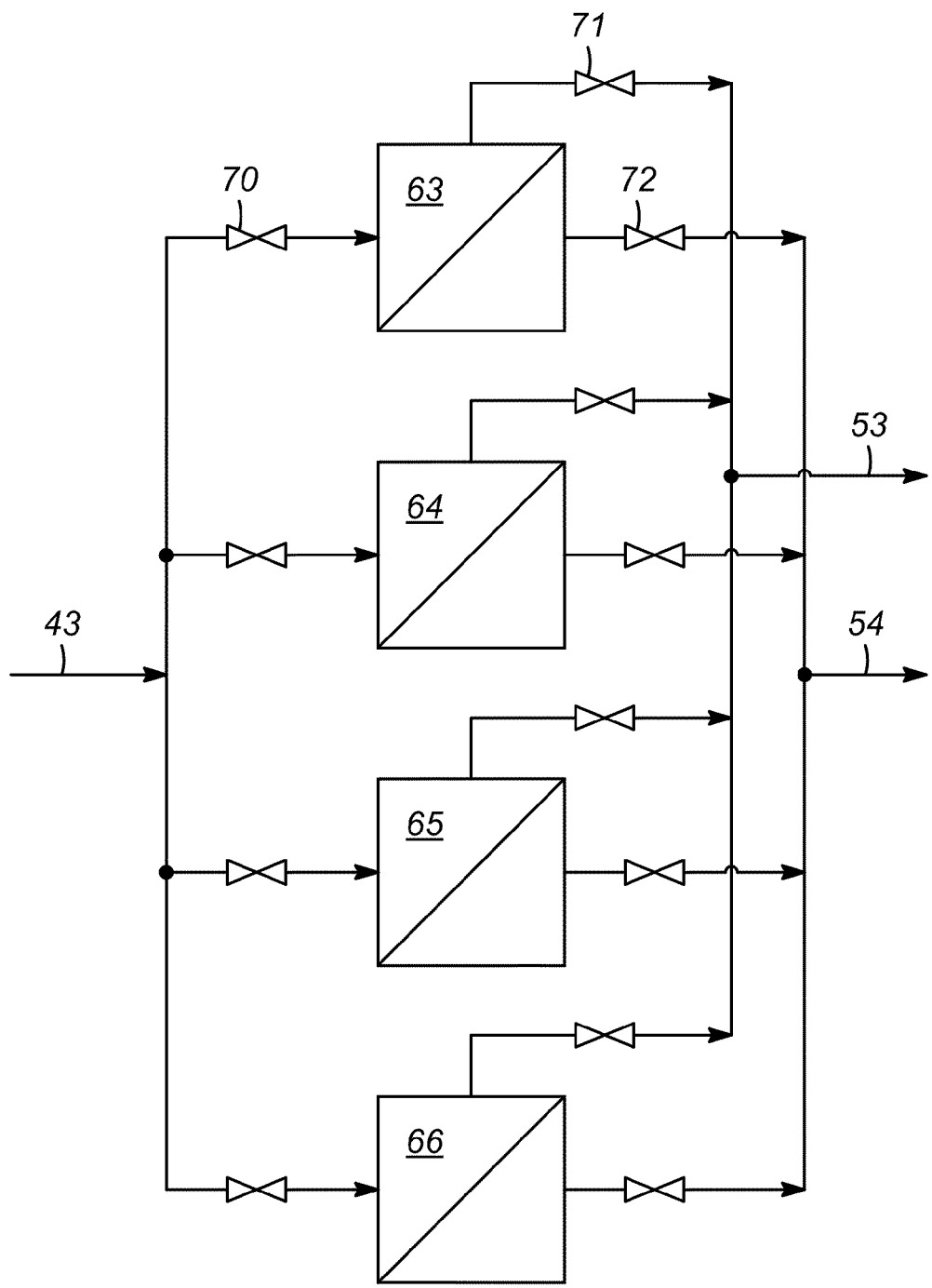
FIG. 6 is a primary membrane unit having unequal sub-sections of membrane area.

As an example, the Primary Membrane Unit (47) may be provided with four unequal sub-sections (63, 64, 65 and 66) as shown in FIG. 6. The membrane housings may be isolated with valves (for example (70), (71) and (72) to block off membrane sections containing 11% (63), 11% (64), 33% (65), and 45% (66) of the total installed membrane area. This isolation arrangement allows operators to place the following percentages of membrane capacity on line: 11, 22, 33, 44, 45, 55, 56, 67, 78, 89 and 100%. (For example, 11% is achieved with one section (63 or 64) on line, 44% is achieved with two sections on line (64 and 65), etc.) This level of variation provides optimal membrane performance over a wide range of $CO_2$ removal requirements while meeting tight product composition specifications on residue and permeate gas.

Prior art systems may have 25% turndown (equal) capability (as a fair comparison to proposed art), allowing operators to place 25, 50, 75 or 100% area on line. It is also possible to add/remove elements (and hence active membrane area) to/from the membrane housing but this requires shut-down, rework, and restart of system as soon as $CO_2$ level or feed gas flow changes as area has to be added/removed in order to meet tight product composition specifications on product and permeate side. Prior art systems do not provide the optimal variation in membrane area obtained via application of the present invention.

EXAMPLE

Table 1 shows the results for a specific case where the inlet $CO_2$ level is 34.8 mole % and the residue specification is 5% $CO_2$ while the permeate $CO_2$ content is required to meet a minimum level of 68%. Both prior art and the present invention are designed to meet this maximum flow rate case. Then, during actual operation of the $CO_2$ removal unit, the flow rate available for processing is only 88% of the maximum flow. Table 2a shows the negative effect on the $CO_2$ level in the permeate stream when the unit is operated with 100% of the design membrane area on-line. Table 2b shows the negative effect on the $CO_2$ level in the residue gas when the unit isolation is employed to reduce available membrane area to 75%. Header numbers in Table 1, Table 2a, and Table 2b (10, 12, 11) refer to the streams in FIG. 1.

Table 3 shows that the current invention can meet both the residue gas and permeate $CO_2$ targets by (a) opening the bypass of the pre-membrane unit and (b) isolating 67% of the primary membrane area. Header numbers in Table 3 (40, 44, 43, 53, 48, 49, 54) refer to streams in FIG. 4. This performance illustrates that the system of the present invention maintains optimal operation of the unit over a wider range of operating conditions than does the prior art. The example is based on maintaining the permeate pressure at the minimum allowable level (40 psi) due to downstream requirements while allowing some variation in the feed gas temperature (up to 140° F.) for both prior art and the current invention. Results in the tables are simulated values using commercial simulation software. Results are descriptive of trend for example design basis feed case. The system of the present invention is thus more useful for design of a system with requirements of processing wide range of feed $CO_2$ levels at wide range of flow rates, while meeting tight product and permeate specifications.

TABLE 1

| Stream Name | 10 | 12 | 11 |
|---|---|---|---|
| Temperature, C. | 29.8 | 36.6 | 46.3 |
| Pressure, kPag | 4840 | 4723 | 276 |
| Molar Flow, MMSCFD | 165 | 86 | 79 |
| Composition, Mole Fraction | | | |
| Carbon dioxide | 0.3478 | 0.0412 | 0.6804 |
| Nitrogen | 0.0041 | 0.0058 | 0.0023 |
| Methane | 0.5292 | 0.7411 | 0.2993 |
| Ethane | 0.0597 | 0.1013 | 0.0145 |
| Propane | 0.0344 | 0.0637 | 0.0026 |
| i-Butane | 0.0050 | 0.0094 | 0.0002 |
| n-Butane | 0.0114 | 0.0215 | 0.0004 |
| i-Pentane | 0.0021 | 0.0040 | 0.0000 |
| n-Pentane | 0.0052 | 0.0099 | 0.0001 |
| n-Hexane | 0.0010 | 0.0019 | 0.0000 |
| n-Heptane | 0.0001 | 0.0002 | 0.0000 |

TABLE 2a

| Stream Name | 10 | 12 | 11 |
|---|---|---|---|
| Temperature, C. | 29.8 | 35.7 | 45.9 |
| Pressure, kPag | 4840 | 4737 | 276 |
| Molar Flow, MMSCFD | 145 | 72 | 73 |
| Composition, Mole Fraction | | | |
| Carbon dioxide | 0.3478 | 0.0334 | 0.6574 |
| Nitrogen | 0.0041 | 0.0058 | 0.0025 |
| Methane | 0.5292 | 0.7411 | 0.3206 |
| Ethane | 0.0597 | 0.1043 | 0.0157 |
| Propane | 0.0344 | 0.0665 | 0.0029 |
| i-Butane | 0.0050 | 0.0098 | 0.0002 |
| n-Butane | 0.0114 | 0.0225 | 0.0005 |
| i-Pentane | 0.0021 | 0.0042 | 0.0001 |
| n-Pentane | 0.0052 | 0.0104 | 0.0001 |
| n-Hexane | 0.0010 | 0.0020 | 0.0000 |
| n-Heptane | 0.0001 | 0.0002 | 0.0000 |

TABLE 2b

| Stream Name | 10 | 12 | 11 |
|---|---|---|---|
| Temperature, C. | 29.8 | 44.6 | 53.5 |
| Pressure, kPag | 4840 | 4688 | 276 |
| Molar Flow, MMSCFD | 145 | 78 | 67 |
| Composition, Mole Fraction | | | |
| Carbon dioxide | 0.3478 | 0.0510 | 0.6915 |
| Nitrogen | 0.0041 | 0.0057 | 0.0023 |
| Methane | 0.5292 | 0.7366 | 0.2890 |
| Ethane | 0.0597 | 0.0992 | 0.0139 |
| Propane | 0.0344 | 0.0620 | 0.0025 |
| i-Butane | 0.0050 | 0.0091 | 0.0002 |
| n-Butane | 0.0114 | 0.0209 | 0.0004 |
| i-Pentane | 0.0021 | 0.0039 | 0.0000 |
| n-Pentane | 0.0052 | 0.0096 | 0.0001 |
| n-Hexane | 0.0010 | 0.0018 | 0.0000 |
| n-Heptane | 0.0001 | 0.0002 | 0.0000 |

TABLE 3

| Stream Name | 40 | 44 | 43 | 53 | 48 | 49 | 54 |
|---|---|---|---|---|---|---|---|
| Temperature, C. | 29.8 | 34.4 | 25.1 | 36.6 | 30.4 | 43.1 | 38.9 |
| Pressure, kPag | 4840 | 4806 | 4792 | 4675 | 276 | 276 | 276 |
| Molar Flow, MMSCFD | 145 | 58 | 65 | 78 | 22 | 45 | 67 |
| Composition, Mole Fraction | | | | | | | |
| Carbon dioxide | 0.3478 | 0.3478 | 0.1843 | 0.0488 | 0.8396 | 0.6302 | 0.6983 |
| Nitrogen | 0.0041 | 0.0041 | 0.0051 | 0.0056 | 0.0013 | 0.0030 | 0.0024 |
| Methane | 0.5292 | 0.5292 | 0.6545 | 0.7372 | 0.1524 | 0.3494 | 0.2853 |
| Ethane | 0.0597 | 0.0597 | 0.0775 | 0.1001 | 0.0060 | 0.0154 | 0.0123 |
| Propane | 0.0344 | 0.0344 | 0.0457 | 0.0628 | 0.0006 | 0.0015 | 0.0012 |
| i-Butane | 0.0050 | 0.0050 | 0.0066 | 0.0092 | 0.0000 | 0.0001 | 0.0001 |
| n-Butane | 0.0114 | 0.0114 | 0.0152 | 0.0210 | 0.0001 | 0.0003 | 0.0002 |
| i-Pentane | 0.0021 | 0.0021 | 0.0028 | 0.0039 | 0.0000 | 0.0000 | 0.0000 |
| n-Pentane | 0.0052 | 0.0052 | 0.0070 | 0.0096 | 0.0000 | 0.0001 | 0.0001 |
| n-Hexane | 0.0010 | 0.0010 | 0.0013 | 0.0018 | 0.0000 | 0.0000 | 0.0000 |
| n-Heptane | 0.0001 | 0.0001 | 0.0001 | 0.0002 | 0.0000 | 0.0000 | 0.0000 |

In view of the present disclosure, it will be appreciated that other advantageous results may be obtained. Those having skill in the art, with the knowledge gained from the present disclosure, will recognize that various changes can be made in the above apparatuses and methods without departing from the scope of the present disclosure. Mechanisms used to explain theoretical or observed phenomena or results, shall be interpreted as illustrative only and not limiting in any way the scope of the appended claims.

The invention claimed is:

1. A system for treating a feed gas stream, containing an undesirable amount of $CO_2$ comprising:

(a) a pre-membrane unit comprising a membrane and having a feed side and a residue side;
(b) a first gas flow line connected to the feed side of the pre-membrane unit for transferring a feed gas stream to the feed side of the pre-membrane unit wherein said feed gas stream has variable flow rates from 50 to 210 MMSCFD and $CO_2$ content from 8 to 60 mole % and wherein said feed gas stream passes through a pre-membrane preheater before entering said feed side of the pre-membrane unit;
(c) a primary membrane unit comprising a membrane and having a feed side and a residue side;
(d) a second gas flow line connecting the residue side of the pre-membrane unit to the feed side of the primary membrane unit for transferring a first residual gas stream from the residue side of the pre-membrane unit to the feed side of the primary membrane unit;
(e) a first bypass around the pre-membrane unit, wherein the first bypass connects the first gas flow line to the second gas flow line to allow at least partial bypass of the feed gas stream around the pre-membrane unit; and
(f) a second bypass around the primary membrane unit, wherein the second bypass connects the second gas flow line to a third gas flow line connected to the residual side of the primary membrane unit to allow at least partial bypass of the first residual gas stream around the primary membrane unit;
wherein said primary membrane unit is smaller than said pre-membrane unit.

2. The system of claim 1 wherein the primary membrane unit comprises at least two sub-sections to provide un-equal isolation of the primary membrane, wherein each section can be deactivated by isolation from active $CO_2$ removal.

3. The system of claim 2 wherein the primary membrane unit comprises four unequal sub-sections.

4. The system of claim 3 wherein the four sub-sections provide 11%, 11%, 33%, and 45% of the total primary membrane area, respectively.

5. The system of claim 1 further comprising a first monitor positioned in the first gas flow line to monitor the flow rate of the feed gas stream, the concentration of the $CO_2$ in the feed gas stream, or both.

6. The system of claim 5 further comprising a first control in communication with the first monitor to at least partially alter the flow of feed gas stream between the pre-membrane unit and the first bypass.

7. The system of claim 5 further comprising a second monitor positioned in the second gas flow line to monitor the flow rate of the first residual gas stream, the concentration of the $CO_2$ in the first residual gas stream, or both.

8. The system of claim 7 further comprising a second control in communication with the second monitor to at least partially alter the flow of the first residual gas stream between the primary membrane unit and the second bypass.

9. The system of claim 1 further comprising a pre-membrane unit pre-heater positioned in the feed gas flow line prior to the pre-membrane unit.

10. The system of claim 1 further comprising a primary membrane pre-heater positioned between the pre-membrane unit and the primary membrane unit.

11. A process for treating a feed gas stream, containing an undesirable amount of $CO_2$ comprising:
(a) feeding a feed gas stream having variable flow rates from 50 to 210 MMSCFD and $CO_2$ content from 8 to 60 mole % through a first gas flow line to a pre-membrane unit wherein said feed gas stream passes through a pre-membrane preheater before entering said feed side of the pre-membrane unit;
(b) in the pre-membrane unit, separating the feed gas stream into a first permeate stream enriched in $CO_2$ and a first residue stream having reduced $CO_2$;
(c) directing the first residue stream through a second gas flow line to a primary membrane unit to separate the first residue stream into a second permeate stream enriched in $CO_2$ and a second residue stream deplete of $CO_2$ wherein said primary membrane unit is smaller than said pre-membrane unit;
(d) monitoring flow rate, $CO_2$ concentration, or both of the feed gas stream;
(e) upon detection of pre-selected feed gas flow rates, $CO_2$ concentrations, or both, diverting at least part of the feed gas stream to a first bypass connected to the first gas flow line to allow at least partial bypass of the feed gas stream from the pre-membrane unit;
(f) monitoring flow rate, $CO_2$ concentration, or both of the first residual gas stream; and
(g) upon detection of pre-selected gas flow rates, $CO_2$ concentrations, or both, in the first residual gas stream, diverting at least part of the first residual gas stream to a second bypass connected to the second gas flow line to allow at least partial bypass of the residual gas stream from the primary membrane unit.

12. The process of claim 11 further comprising pre-heating the feed gas stream prior to separation in the pre-membrane unit.

13. The process of claim 11 further comprising pre-heating the first residual gas stream prior to separation in the primary membrane unit.

14. The process of claim 11 wherein the flow rate of the feed gas stream is in the range of 50 to 210 MMSCFD and the $CO_2$ levels are in the range of 8 to 60 mole %.

15. The process of claim 12 wherein the primary membrane unit comprises at least two sub-sections to provide un-equal isolation of the primary membrane, wherein each section can be deactivated by isolation from active $CO_2$ removal.

16. The process of claim 15 wherein the primary membrane unit comprises four sub-sections.

17. A system for treating a feed gas stream, containing an undesirable amount of $CO_2$ comprising:
(a) a first gas flow line for feeding a feed gas stream having variable flow rates from 50 to 210 MMSCFD and $CO_2$ content from 8 to 60 mole % to a pre-membrane unit and wherein said feed gas stream passes through a pre-membrane preheater before entering said feed side of the pre-membrane unit;
(b) at least one valve in the pre-membrane unit for partial isolation of some percentage of the membrane, thus making that membrane area unavailable for gas processing;
(c) a second gas flow line for feeding a feed gas stream to a primary membrane unit wherein said primary membrane unit is smaller than said pre-membrane unit; and
(d) at least one valve in the primary membrane unit for partial isolation of a percentage of the membrane, thus making that membrane area unavailable for gas processing.

18. The system of claim 17 wherein the primary membrane unit comprises at least two sub-sections to provide un-equal isolation of the primary membrane, wherein each section can be deactivated by isolation from active $CO_2$ removal.

19. The system of claim 17 wherein the primary membrane unit comprises four unequal sub-sections.

20. The system of claim 19 wherein the four sub-sections provide 11%, 11%, 33%, and 45% of the total primary membrane area respectively.

* * * * *